No. 661,251. Patented Nov. 6, 1900.
S. F. RUKENBROD.
FLOUR SIEVE.
(Application filed Mar. 25, 1899.)
(No Model.)

WITNESSES:

INVENTOR
S. F. Rukenbrod.

BY

ATTORNEYS

THE NORRIS PETERS CO., PHOTO-LITHO., WASHINGTON, D. C.

UNITED STATES PATENT OFFICE.

SAMUEL FRANCIS RUKENBROD, OF YOUNGSTOWN, OHIO.

FLOUR-SIEVE.

SPECIFICATION forming part of Letters Patent No. 661,251, dated November 6, 1900.

Application filed March 25, 1899. Serial No. 710,417. (No model.)

*To all whom it may concern:*

Be it known that I, SAMUEL FRANCIS RUKENBROD, a citizen of the United States of America, residing at Youngstown, in the county of Mahoning and State of Ohio, have invented certain new and useful Improvements in Flour-Sieves, of which the following is a specification, reference being had therein to the accompanying drawings.

My invention relates to certain new and useful improvements in flour-sieves.

The object of my invention is to construct a flour-sieve with a spring-actuated shaker to assist in the discharging of the flour through the wire sieve.

My invention further consists in the novel combination and arrangement of parts hereinafter more fully described, and particularly pointed out in the claim.

In describing the invention in detail reference is had to the accompanying drawings, forming a part of this specification, wherein like numerals of reference indicate corresponding parts throughout both views thereof, and in which—

Figure 1:
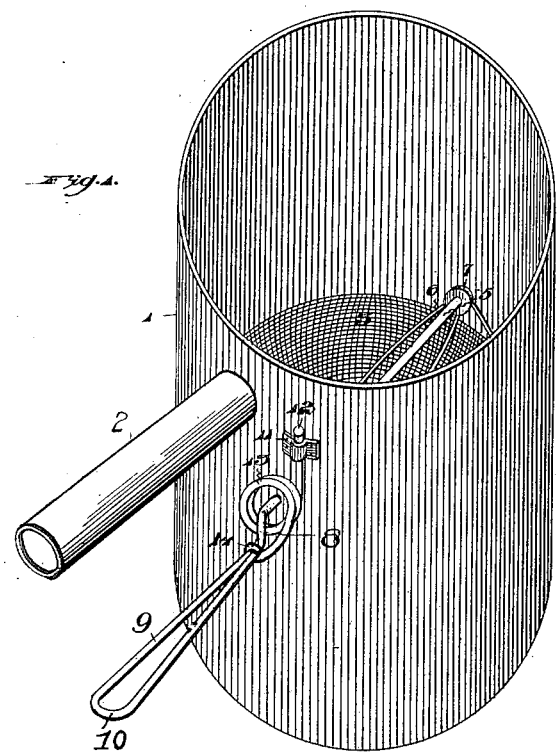
Figure 2:
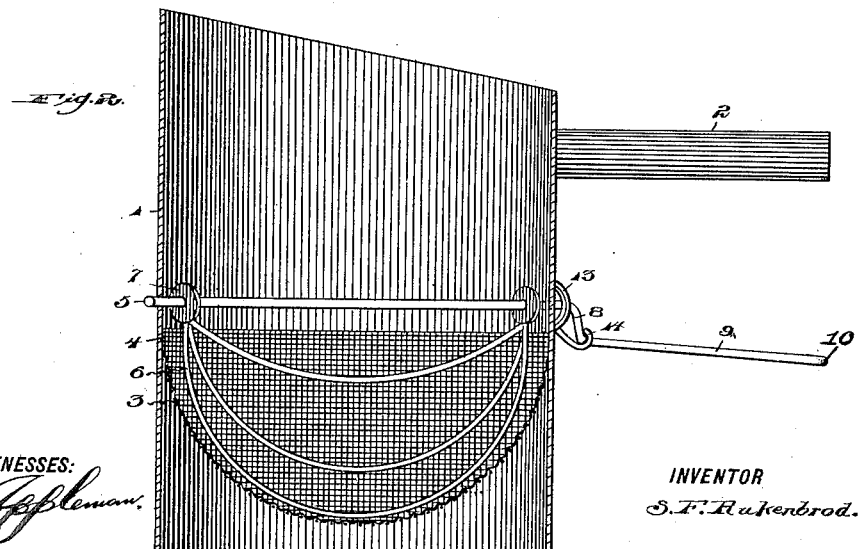

Figure 1 is a perspective view of my improved flour-sieve. Fig. 2 is a vertical sectional view thereof.

Referring to the drawings by reference-numerals, 1 indicates a hollow cylindrical receptacle provided with an outwardly-extending handle 2 near the upper end thereof. The top of this cylindrical receptacle is inclined, as shown, to assist in the scooping up of the flour or other material. The bottom of this cylindrical receptacle 1 is formed of a semispherical piece of wire-gauze 3, which is secured to the inner face of the receptacle, as at 4, a little below one-half the length of the same. This wire-gauze is used as a sifter for the flour or other material.

The cylindrical body or receptacle 1 is provided in oppositely-located sides with openings, in which is journaled the operating-shaft 5 for the agitator or beater. The agitator or beater consists of a series of curved or bent wires 6, which are connected at their ends to disks 7, mounted on the shaft 5 inside the receptacle 1. This shaft 5 extends outwardly from the receptacle upon the same side thereof as the handle 2 and is bent at right angles, as at 8, then substantially horizontally, as at 9, and doubled upon itself, as at 10, the end being soldered or otherwise secured to the portion 9 at the intersection with the part 8. These portions 9 and 10 form the handle by means of which the beaters are operated.

Secured to the wall of the receptacle adjacent to the handle 2 is a keeper 11, which is adapted to receive the end 12 of the actuating-spring 13, which is coiled around the shaft 5, where the latter projects through the wall of the receptacle, and has its end 14 looped or bent onto the handle 9 and rigidly soldered or otherwise secured thereto.

The operation of my improved flour-sieve is as follows: The operator grasps the handle 2 in the palm of the hand and grips the handle of the operating-shaft with the fingers and draws this latter handle into substantially the same vertical plane as the handle 2, thereby rocking the shaft and beaters, the spring 13 during such operation being compressed, and when the grip of the fingers with the shaft-handle is released this spring returns the shaft and handle and also the beaters 6 to their former position. The fingers need not be disengaged from the handle of the shaft, but the pressure merely relieved when this handle has been drawn into alinement with the handle 2, so that the spring may be allowed to exert its action to return the beaters. It will be noted that by such a construction the beaters 6 are operated so as to agitate the material both when the handle of the operating-shaft is being drawn into alinement with the handle 2 and when the spring 13 is returning the same to its former position, thoroughly agitating the material, so as to cause the same to sift through the screen or sieve without shaking the receptacle, and thus permitting the retention of the latter at all times over the vessel into which the material is being sifted.

Having thus fully described my invention, what I claim as new, and desire to secure by Letters Patent, is—

In a flour-sieve, the combination of a hollow cylindrical receptacle having its top end inclined, a handle secured to the periphery of said receptacle at the shorter side thereof and near the top edge, a semispherical-shaped screen or sieve connected to the inner face of said receptacle below the center thereof, an operating-shaft journaled centrally of the said casing and extending entirely therethrough and further extending outwardly on one side and bent downwardly, outwardly and upon itself forming a handle below the plane of the operating-shaft, a pair of disks mounted upon said shaft within the said receptacle, a series of curvilinear wire beaters arranged in said screen and connected at their ends to the said disks, a keeper secured to the periphery of said receptacle, and a coiled retractile spring having one end working freely in the said keeper, and its opposite end rigidly secured to the inner end of said handle, said spring being adapted to rock the operating-shaft in the direction opposite to that in which it is rocked by means of its handle, substantially as described.

In testimony whereof I affix my signature in the presence of two witnesses.

SAMUEL FRANCIS RUKENBROD.

Witnesses:
GEO. H. GLAZZARD,
R. A. BEARD.